United States Patent
Kashiwagi et al.

(10) Patent No.: US 6,681,046 B1
(45) Date of Patent: Jan. 20, 2004

(54) METHOD AND APPARATUS FOR ANALYZING IMAGE DATA, STORAGE MEDIUM FOR STORING SOFTWARE PRODUCT FOR ANALYZING IMAGE DATA

(75) Inventors: Koichi Kashiwagi, Tokyo-to (JP); Yoshito Fujino, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/478,180

(22) Filed: Jan. 5, 2000

(30) Foreign Application Priority Data

Jan. 6, 1999 (JP) .......................................... 11-001179

(51) Int. Cl.[7] ................................................. G06K 9/46
(52) U.S. Cl. ...................................... 382/195; 382/286
(58) Field of Search .............................. 382/195, 286; 707/503, 504, 505, 506, 507, 508, 509, 510; 715/503–510

(56) References Cited

U.S. PATENT DOCUMENTS

| | | | | |
|---|---|---|---|---|
| 5,379,372 A | * | 1/1995 | Wu | 707/506 |
| 5,420,695 A | * | 5/1995 | Ohta | 358/462 |
| 5,708,730 A | * | 1/1998 | Itonori | 382/177 |
| 5,835,916 A | * | 11/1998 | Inaki et al. | 707/509 |
| 5,881,381 A | * | 3/1999 | Yamashita et al. | 707/509 |
| 6,044,383 A | * | 3/2000 | Suzuki et al. | 707/509 |
| 6,327,387 B1 | * | 12/2001 | Naoi et al. | 382/190 |

* cited by examiner

Primary Examiner—Jon Chang
(74) Attorney, Agent, or Firm—Scully, Scott, Murphy & Presser; Louis P. Herzberg

(57) ABSTRACT

Work of defining a ledger slip for an OCR is reduced as much as possible in registering the kind and position of characters and symbols inputted in the slip. Image data is analyzed to detect a cell (frame in which characters and symbols are entered) included in the image data. It is determined whether the cells continue in a constant pattern. If the cells continue, it is determined that the continuous cells area group of cells in which a common attribute is to be registered. The cell group for which a common attribute is to be registered is displayed on a display device distinctively from other cell groups. The operator can perform a modification work on a specific cell group on the display screen, such as elimination and addition of a part of cells. The operator can also specify a cell group and input an attribute to all cells included in that cell group in a bundle.

9 Claims, 22 Drawing Sheets

[Figure 1]
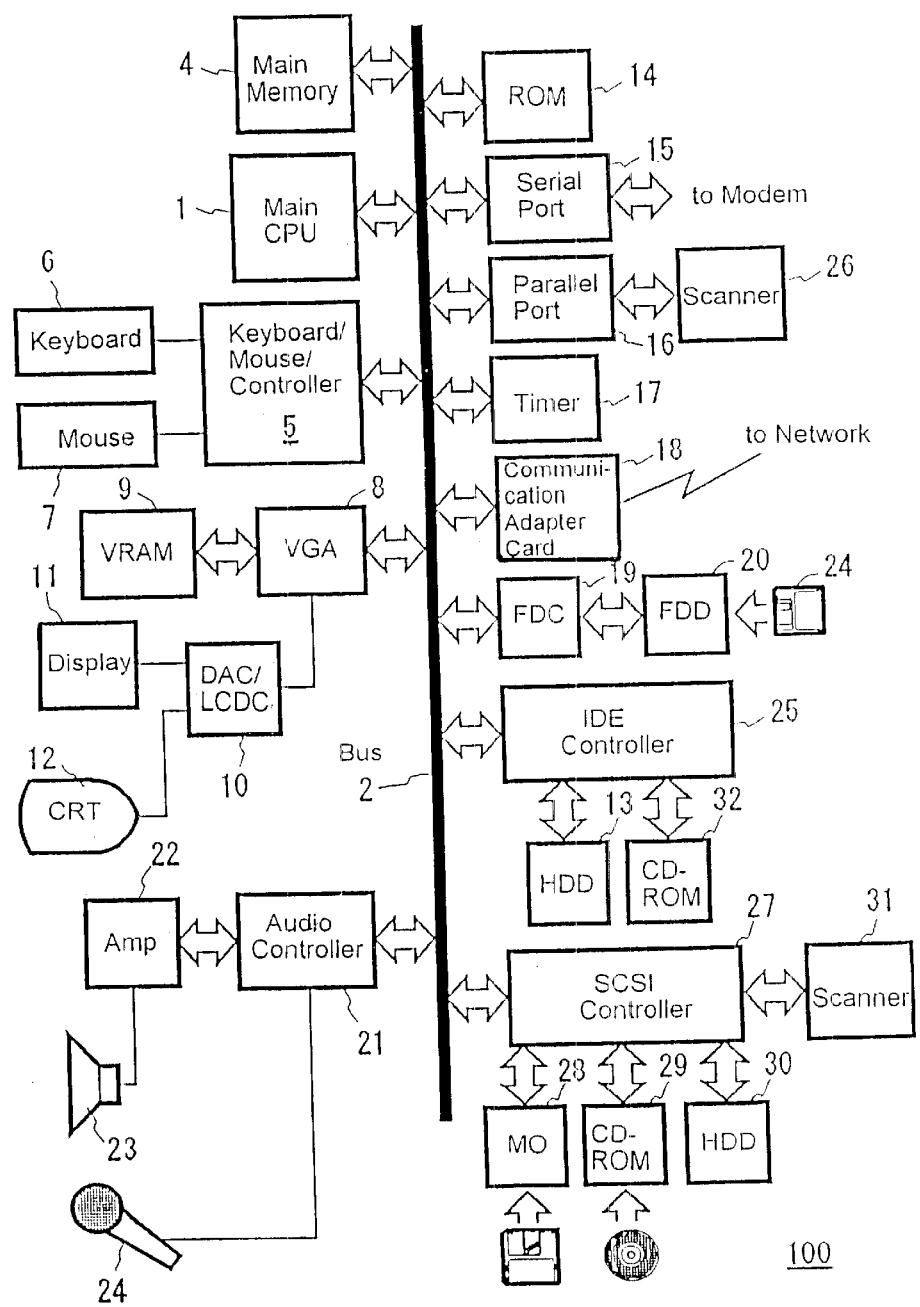

[Figure 2]
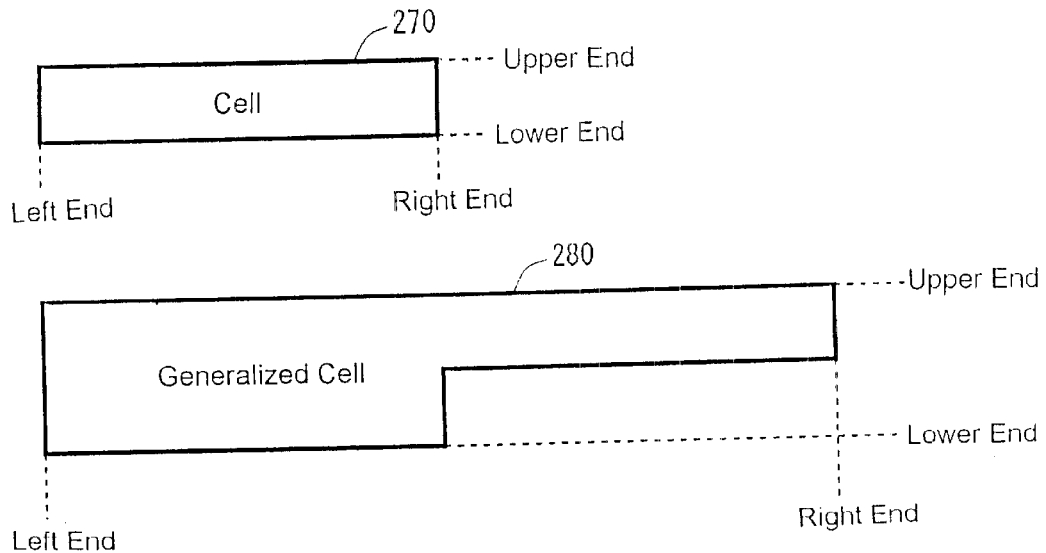
[Figure 4]
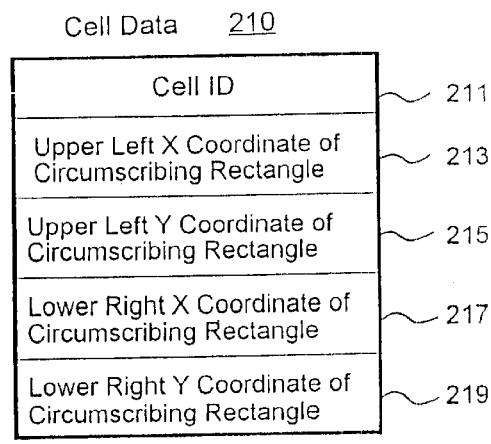
[Figure 5]
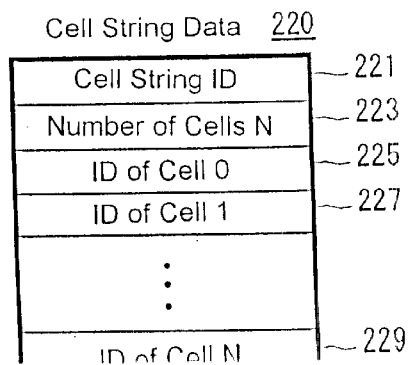

[Figure 3]
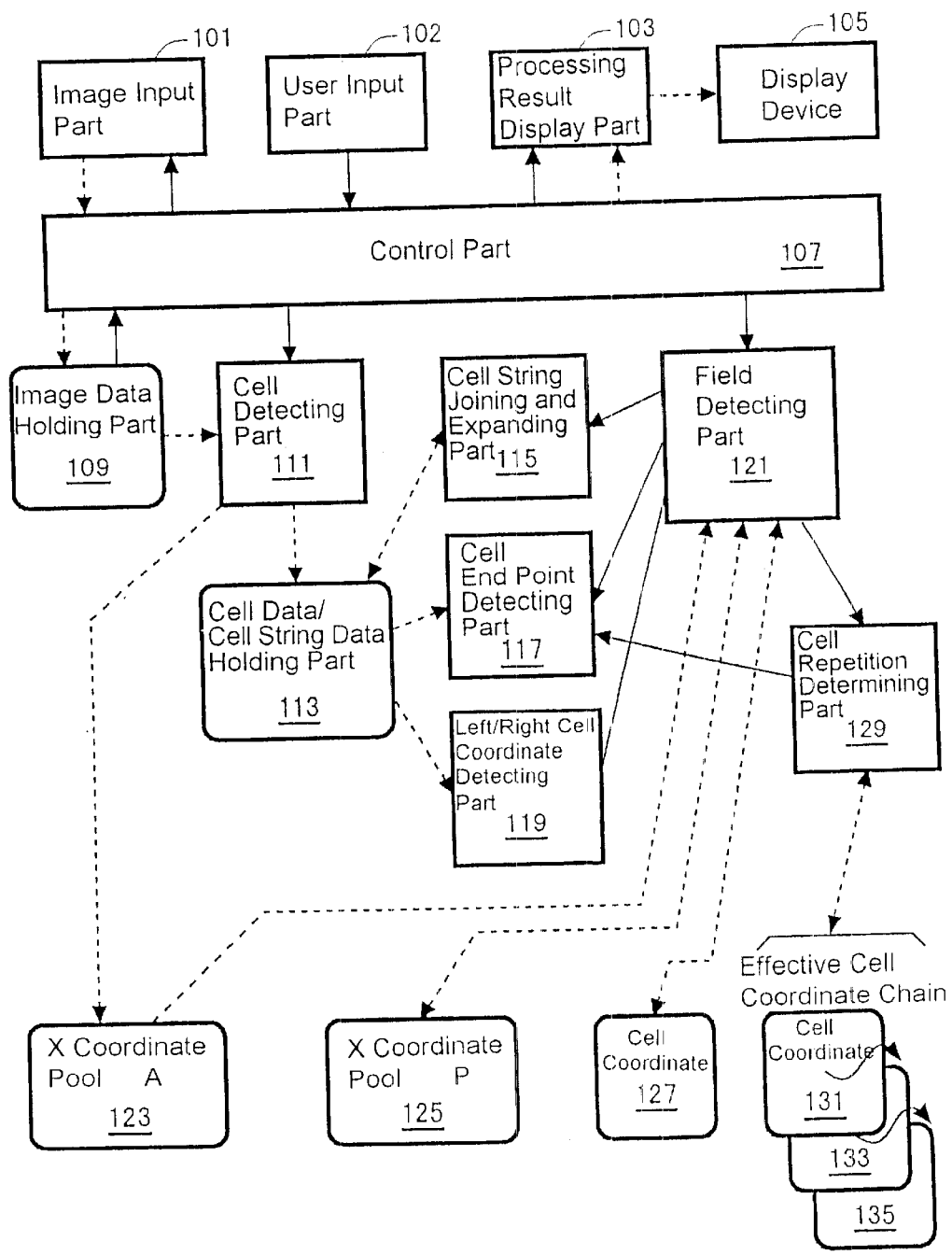

[Figure 6]
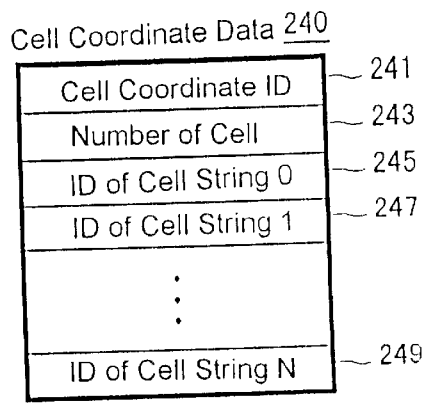
[Figure 7]
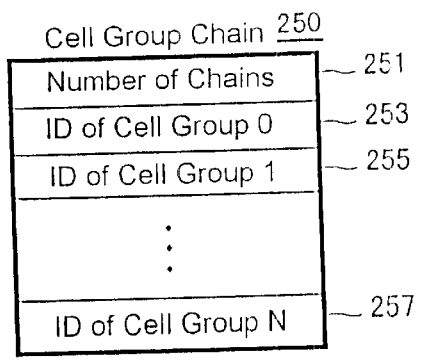
[Figure 8]
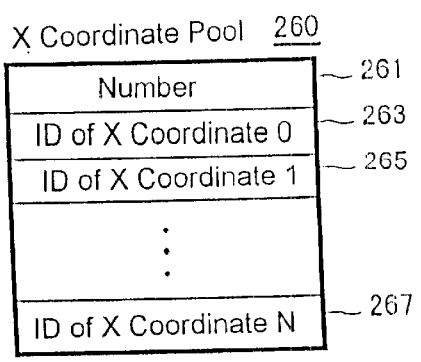

[Figure 9]
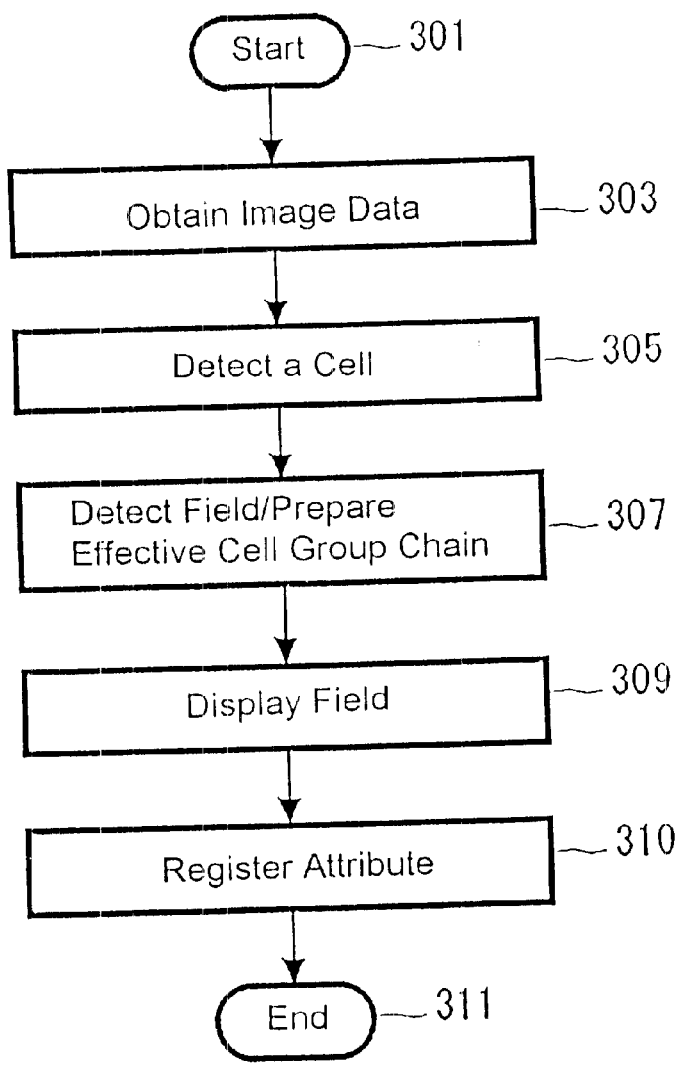

[Figure 10]
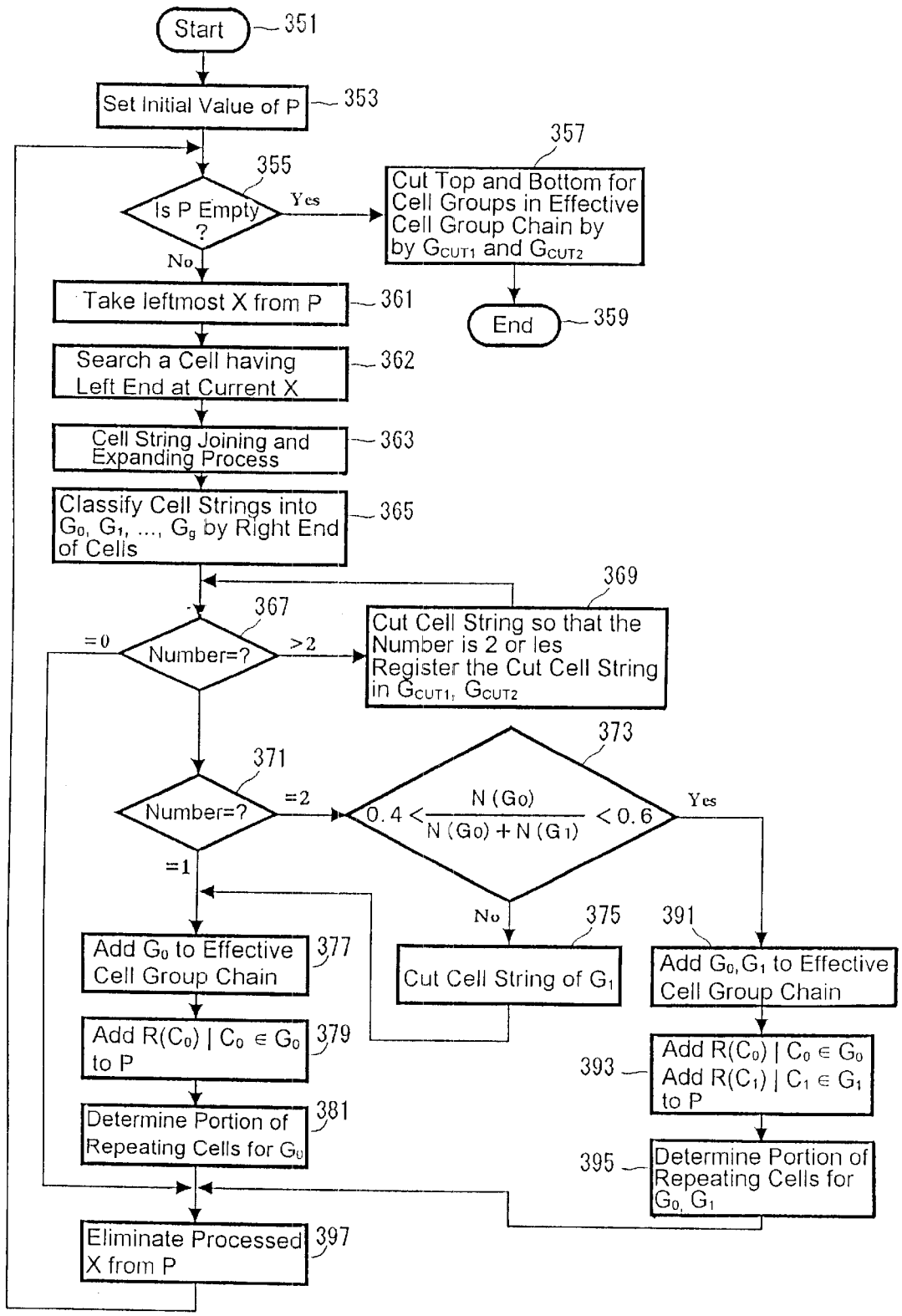

[Figure 11]

| Name | Name of Company | | Personal Information | | | Position |
|------|-----------------|--|---------------------|--|--|----------|
| Membership No. | Phone No. | Address | Birth | Date of Admission | Date of Qualification | (Address) |
| | | | | | | |

[Figure 12]
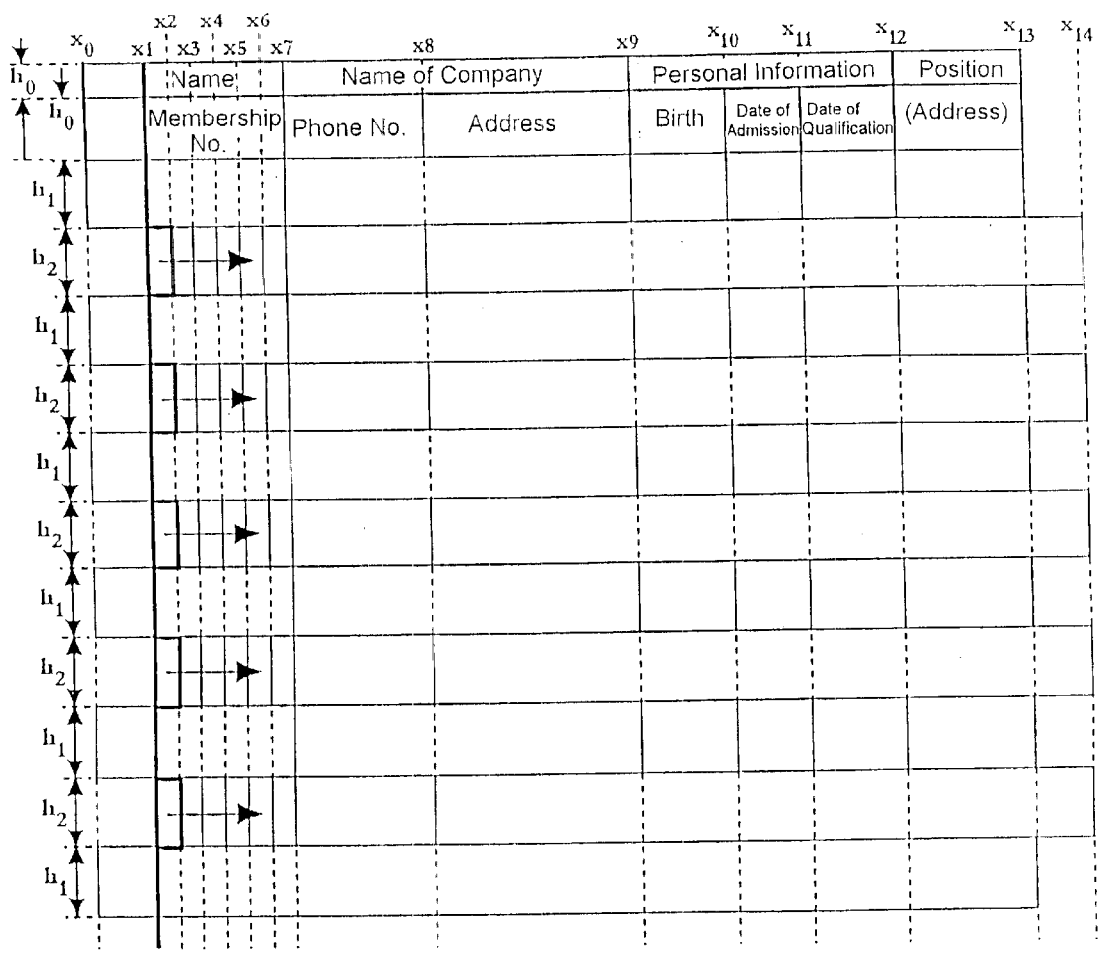

[Figure 13]
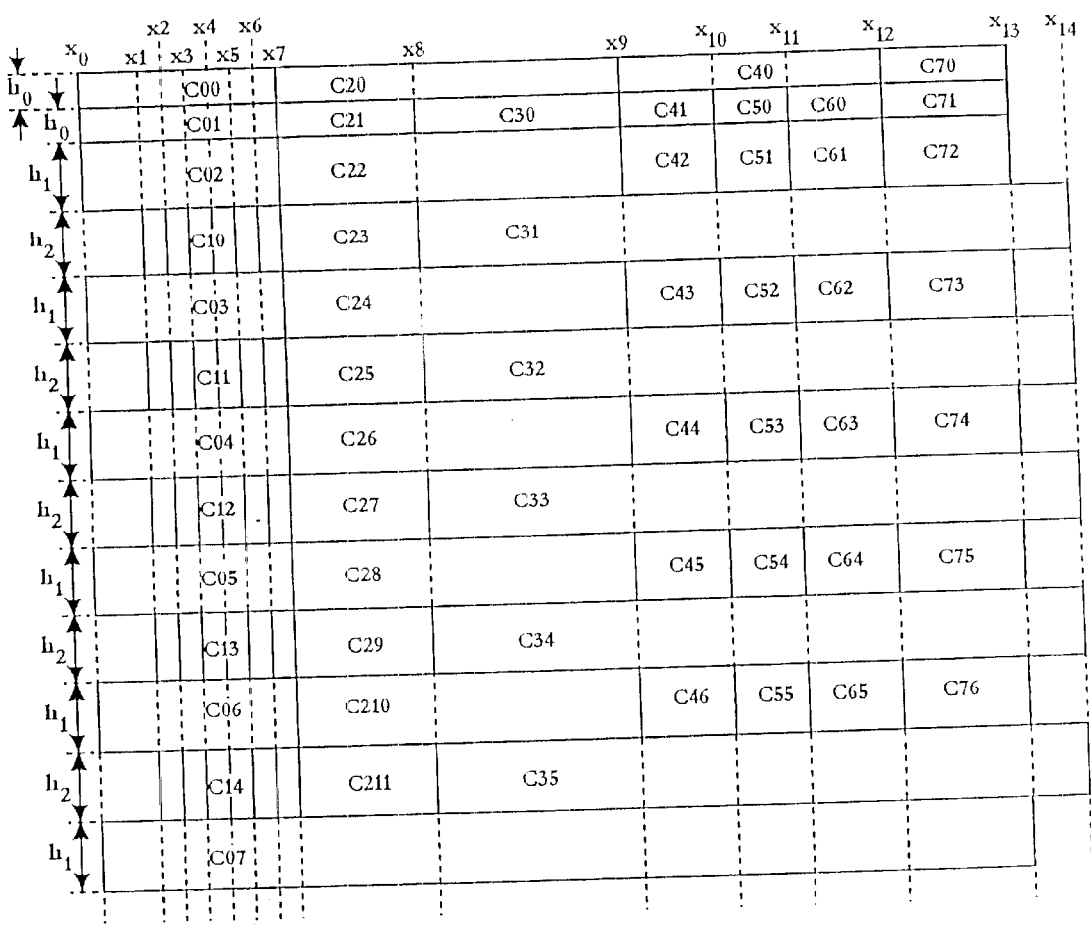

| | Name | | Name of Company | | Personal Information | | | Position |
|---|---|---|---|---|---|---|---|---|
| | Membership No. | | Phone No. | Address | Birth | Date of Admission | Date of Qualification | (Address) |

| | | Type 3 | Type 2 | Type 4 | Type 1 |
|---|---|---|---|---|---|
| 1 | 17 | Type 1 | | | |
| 2 | 16 | Type 2 | | | |
| 3 | 15 | Type 3 | | | |
| 4 | 14 | Type 4 | | | |
| 5 | 13 | Type 2 | | | |
| 6 | 12 | Type 3 | | | |
| 7 | 11 | Type 2 | | | |
| 8 | 10 | Type 3 | | | |
| 9 | 9 | Type 2 | | | |
| 10 | 8 | Type 3 | | | |
| 11 | 7 | Type 2 | | | |
| 12 | 6 | Type 3 | | | |
| 13 | 5 | Type 2 | | | |
| 14 | 4 | Type 3 | | | |
| 15 | 3 | Type 2 | | | |
| 16 | 2 | Type 3 | | | |
| 17 | 1 | Type 4 | | | |

If Upper 4 Lines and Lower 1 Line are Eliminated, the Number of Types is Reduced to 2.

[Figure 25]

| Name | Name of Company | | Personal Information | | | Position |
|---|---|---|---|---|---|---|
| Membership No. | Phone No. | Address | Birth | Date of Admission | Date of Qualification | (Address) |

[Figure 26]
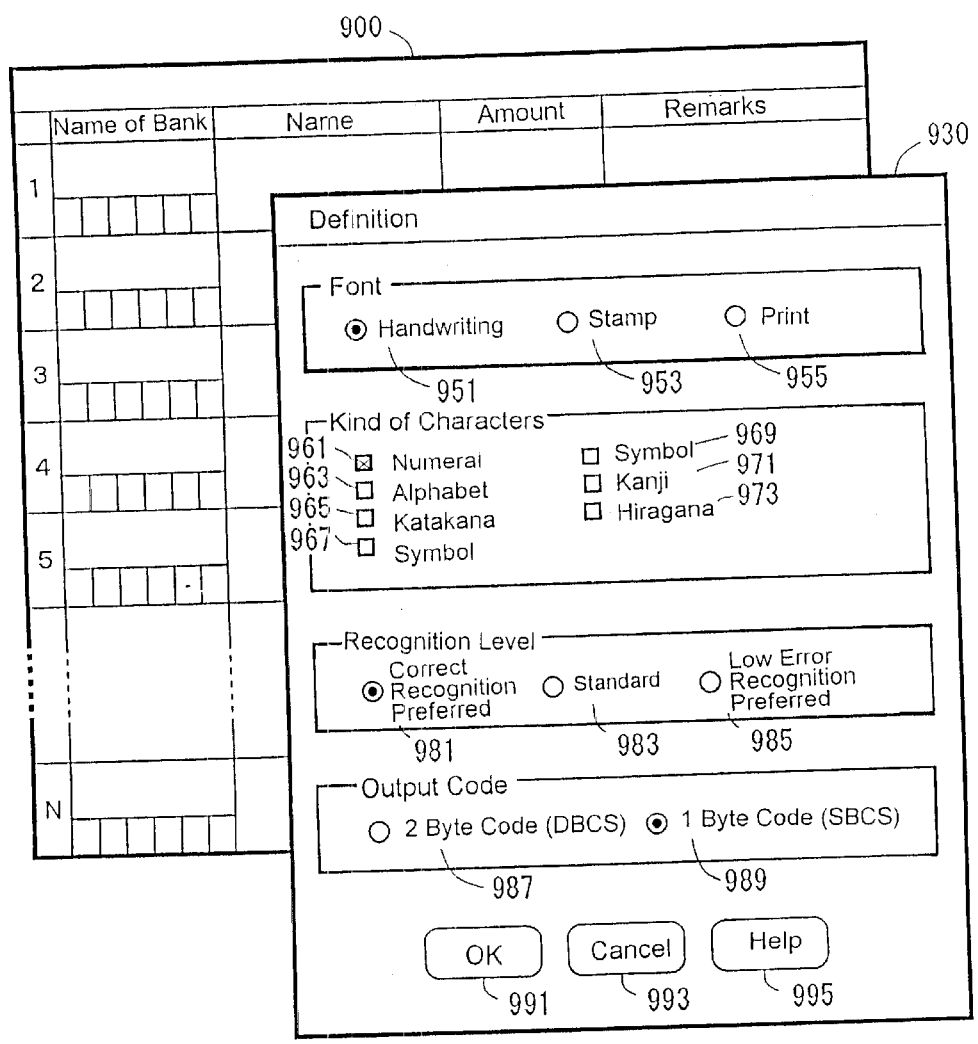

METHOD AND APPARATUS FOR ANALYZING IMAGE DATA, STORAGE MEDIUM FOR STORING SOFTWARE PRODUCT FOR ANALYZING IMAGE DATA

BACKGROUND OF THE INVENTION

1. Technical Field

This invention relates to an image processing method and, more particularly, to a scheme of specifying a plurality of cells which are set to a same attribute as a ledger slip of an inputted bit map image in setting up a character recognition program.

2. Prior Art

In work of defining a ledger slip of an OCR which causes a character recognition program to recognize a ledger slip to be newly recognized by the OCR, the work conventionally involves setting up what kind of characters, numerals and symbols, etc., are inputted in what position. By changing a recognition scheme and a set of reference samples in such work, an erroneous recognition can be avoided such as recognizing a character "O" as a numeral "O" in an area which is set up as a numeral. In addition, because the size of a set is small, a high speed recognition can be advantageously available. Because there is a character which is difficult to recognize especially in a hand written character recognition, such information is indispensable to maintain a predetermined recognition rate.

In a ledger slip definition work of an OCR, it was conventionally required to measure the size of a ledger and relative positions of page mark/position correction mark (also referred to as a timing mark or a reference mark)/character field/character using a scale and input the values thereof so that the work was very cumbersome for an operator. Particularly in a drop out ledger slip (a slip specifically designed for an OCR in which characters and a character frame are printed by a color which can not be recognized by an OCR), this method is widely employed still at the time of filing this patent application and it was necessary to consume a tremendous time to design an OCR program using a new drop out ledger slip.

In order to solve such problems in the prior art, some technologies are currently proposed. An example is a scheme describe in "WinReader Hand v1.5, Users Manual, Setting of Fields" (p19,20) ("WinReader Hand" is a trademark of Media Drive Corporation) in which an image of an unfilled ledger slip having a black frames is read in by a scanner for displaying on a display, all black vertical and horizontal lines are automatically detected, and a plurality of cells which are the units of recognition are specified to set up an attribute after an operator confirms that a straight line is correctly detected.

The above scheme requires less operator work and is much simpler in defining the ledger slip than the scheme using a scale. However, in this character recognition program, all recognition unit cells (columns) included in a ledger slip image have to be specified by an operation of clicking the upper left corner of the cell with a mouse and dragging it to and dropping at the lower right corner.

On the other hand, a multi-entry ledger slip are currently used widely in which the ledger comprises a plurality of series cells (columns) in which an identical attribute is registered as shown in FIG. 26. In defining such multi-entry ledger slip, the above described improved scheme of ledger slip definition requires to specify each cell or each cell string and repeat a cumbersome work of registering the attribute.

SUMMARY OF THE INVENTION

It is an object of this invention to provide a system which allows a ledger slip definition work of an operator to be reduced as much as possible.

It is another object of this invention to provide a system which allows an operator to intuitively recognize a same kind of cells or cell strings to prevent an error in defining a ledger slip.

It is a further object of this invention to provide a system which prevents an error in defining a ledger slip by eliminating repetition of a simple work done by an operator.

In the present invention, image data is analyzed to detect a cell (frame in which a character or a symbol is entered) included in the image data. It is then determined whether the cells continue in a constant pattern and it is determined that the group of the continuous cells is a cell group in which a common attribute is to be registered when the cells are continuous. The cell group in which a common attribute is registered is displayed on a display device distinctively from other group of cells. The operator is allowed to modify such as delete or add a part of cells from or to specific cell group. The operator is also allowed to specify a cell group and input an attribute to all cells included in that cell group in a bundle.

This invention provides, in one aspect thereof, a method of analyzing image data inputted in an image data analyzing apparatus, said method comprising the steps of;

(a) scanning said image data to extract a plurality of cell data items including a starting coordinate value (x,y) and height information, (b) extracting a cell group having a same x coordinate value from said plurality of cell data items, (c) examining the height information of cells included in said extracting cell group, and (d) eliminating a cell having a height information different from other cells included in said extracted cell group from said extracted cell group.

The term "starting coordinate value" as used herein is a concept including not only the upper left point of a rectangle circumscribing a cell but also information necessary to specify the position of a cell including upper right, lower left and lower right points of a rectangle circumscribing the cell. The term "height information" is a concept including distance information between 2 points and information of the coordinate values of 2 points in one dimension. Further, the term "cell" as used in the claims of this specification is a concept including the "cell string" to be described in the preferred embodiment of this invention.

This invention provides, in another aspect thereof, a method of analyzing image data inputted in an image data analyzing apparatus, said method comprising the steps of;

(a) scanning said image data to extract a plurality of cell data items including a starting coordinate value (x, y) and height and width information, (b) extracting a cell group having a same x coordinate value from said plurality of cell data items, (c) analyzing width information of cells included in said extracted cell group to extract a first cell group and a second cell group from said extracted cell group, (d) examining the height information of cells included in said first cell group, and (e) eliminating a cell having a height information different from other cells included in said first cell group from said first cell group.

The term "width information" as used herein is a concept including distance information between 2 points and information of the coordinate values of 2 points in a dimension other than the height.

This invention provides, in another aspect thereof, a method of analyzing image data inputted in an image data analyzing apparatus, said method comprising the steps of;
(a) scanning said image data to extract a plurality of cell data items including a starting coordinate value (x,y) and width information,
(b) extracting a cell group having a same x coordinate value from said plurality of cell data items,
(c) examining the width information of cells included in said extracted cell group, and
(d) extracting cells having substantially same width information among cells included in said extracted cell group as a new cell group.

This invention provides, in another aspect thereof, a method of analyzing image data inputted in an image data analyzing apparatus which is provided with an input device and a display device, said method comprising the steps of;
(a) scanning said image data to extract a plurality of cell data items including a starting coordinate value (x,y) and height information,
(b) extracting a cell group having a same x coordinate value from said plurality of cell data items,
(c) examining the height information of cells included in said extracted cell group, and
(d) eliminating a cell having a height information different from other cells included in said extracted cell group from said extracted cell group to generate a new cell group,
(e) displaying said new cell group in said display device,
(f) detecting that cells included in said new cell group are selected by an operator using said input device, and
(g) saving attribute information inputted by said operator in correlation to at least a partial set of cells included in said new cell group.

This invention provides, in on aspect thereof, an image analyzing apparatus for analyzing image data held in an image data holding part, said apparatus comprising;
(a) a cell detecting part for extracting a plurality of cell data items including a starting coordinate value (x,y) and height information from scanned image data,
(b) a field detecting part for extracting a cell group having a same x coordinate value from said plurality of cell data items,
(c) a cell repetition determining part for examining the height information of cells included in said extracted cell group, and eliminating a cell having a height information different from other cells included in said extracted cell group.

This invention provides, in one aspect thereof, a recording medium storing a software product for analyzing image data inputted in an image analyzing apparatus, said software product comprising;
(a) a program code for instructing said image data analyzing apparatus to extract a plurality of cell items including a starting coordinate value (x, y) and height information from scanned image data,
(b) a program code for instructing said image data analyzing apparatus to extract a cell group having a same x coordinate value from said plurality of cell data items,
(c) a program code for instructing said image data analyzing apparatus to examine the height information of cells included in said extracted cell group, and
(d) a program code for instructing said image data analyzing apparatus to eliminate a cell having a height information different from other cells included in said extracted cell group from said extracted cell group.

This invention provides, in one aspect thereof, a recording medium storing a software product for analyzing image data inputted in an image data analyzing apparatus, said software product comprising;
(a) a program code for instructing said image data analyzing apparatus to extract a plurality of cell data items including a starting coordinate value (x,y) and, height and width information from scanned image data,
(b) a program code for instructing said image data analyzing apparatus to extract a cell group having a same x coordinate value from said plurality of cell data items,
(c) a program code for instructing said image data analyzing apparatus to analyze the width information of cells included in said extracted cell group, and to extract a first and a second groups of cells from said extracted cell group,
(d) a program code for instructing said image data analyzing apparatus to examine the height information of cells included in said first cell group and
(e) a program code for instructing said image data analyzing apparatus to eliminate a cell having a height information different from other cells included in said first cell group from said first cell group.

This invention provides, in a further aspect thereof, a recording medium storing a software product for analyzing image data inputted in an image data analyzing apparatus, said software product comprising;

hardware configuration implementing the image processing system of this invention. The image processing system 100 comprises a central processing unit (CPU) 1 and memory 4. The CPU 1 and the memory 4 are connected to a hard disk device 13 as an auxiliary storage via a bus 2. A floppy disk device 20 (or recording medium drives such as an MO and CD-ROM) is connected to the bus 2 through a floppy disk controller 19.

A floppy disk (for recording medium such as an MO and CD-ROM) 24 is inserted to the floppy disk device 20 (or recording medium drives such as an MO and CD-ROM). A computer program code which gives instructions to the CPU and the like in cooperation with an operating system to practice this invention is recorded in the floppy disk, the hard disk device 13, and a ROM 14 and executed by being loaded in the memory 4. The computer program code may be compressed or divided into pieces for recording in a plurality of media.

Further, the image processing system 100 may be provided with a user interface hardware including a pointing device 7 (a mouse, a joystick, track ball, etc.) or a keyboard 6 for inputting screen position information, and a display 12 for presenting image data to the user. A speaker 23 receives an audio signal which is D/A (digital/analog conversion) converted by an audio controller 21 via an amplifier 22 for output as a voice.

The image data inputted to the image processing system 100 of this invention is prepared preferably by a scanner and inputted to the image processing system 100 via a parallel port 25. The image data generated by the scanner 31 may be inputted to the image processing device 100 via a SCSI interface and other interface rather than the parallel port 25. The image processing system 100 can communicate with other computer via the serial port 15 and the modem or a communication with other computer via the serial port 15 and the modem or a communication adapter 18 to receive image data and can also receive it from other input means such as a floppy disk device.

As such, it will readily understood that this invention may be practiced by a conventional personal computer (PC), a workstation, and an OCR, or a combination thereof. It should be noted, however, that these components are given for exemplary purpose and it is not meant that all of these components are the indispensable components of this invention. Because this invention is directed to a support to a ledger slip defining work by an operator, components such as the serial port 15, the communication adapter card 18, the audio controller 21, the amplifier 22 and the speaker 23 are not necessary.

While the operating system may desirable include an operating system which supports a GUI multi-windows environment as a standard such as Windows (a trademark of Microsoft Corporation), OS/2 (a trademark of International Business Machines Corporation), the operating system is not limited to any specific operating system environment.

While FIG. 1 shows a system in a stand alone environment, this invention may be implemented in the form of a client/server system in which a client machine is LAN connected to a sever system in which a client machine is LAN connected to a server machine by Ethernet or a token ring, etc., and the client machine side may be provided only with a user input part, processing result display part and an image input part to be described later while the rest of the functions are disposed in a user machine side. As much, it is a matter of choice in designing to dispose what functions in the server side and the client side, and various modifications including a combination of a plurality of machines and distribution of functions to them for practicing this invention is a concept included in the spirit of this invention.

BRIEF DESCRIPTION OF THE DRAWINGS

Preferred embodiments of the present invention will now be described, by way of example only, with reference to the accompanying drawings in which:

FIG. 1 is a block diagram of a hardware configuration.

FIG. 2 is a chart for explaining the terminology used in the detailed description of the invention in this specification.

FIG. 3 is a block diagram of processing components.

FIG. 4 is a schematic chart of cell data which is temporarily held in the preferred embodiment of this invention.

FIG. 5 is a schematic chart of cell string data which is temporarily held in the preferred embodiment of this invention.

FIG. 6 is a schematic chart of cell group data which is temporarily held in the preferred embodiment of this invention.

FIG. 7 is a schematic chart of cell group chain data which is temporarily held in the preferred embodiment of this invention.

FIG. 8 is a schematic chart of X coordinate pool which is temporarily held in the preferred embodiment of this invention.

FIG. 9 is a flow chart showing the processing procedure in the preferred embodiment of this invention.

FIG. 10 is a flow chart showing the processing procedures for preparing an effective cell group chain in the preferred embodiment of this invention.

FIG. 11 is a chart showing an image (image data) of a ledger slip inputted from a scanner used in the preferred embodiment of this invention.

FIG. 12 is a schematic chart showing a process of analyzing image data used in the preferred embodiment of this invention.

FIG. 13 is a schematic chart showing a process of analyzing image data used in the preferred embodiment of this invention.

FIG. 14 is a schematic chart showing a process of analyzing image data used in the preferred embodiment of this invention.

FIG. 15 is a schematic chart showing a process of analyzing image data used in the preferred embodiment of this invention.

FIG. 16 is a schematic chart showing a process of analyzing image data used in the preferred embodiment of this invention.

FIG. 17 is a schematic chart showing a process of analyzing image data used in the preferred embodiment of this invention.

FIG. 18 is a schematic chart showing a process of analyzing image data used in the preferred embodiment of this invention.

FIG. 19 is a schematic chart showing a process of analyzing image data used the preferred embodiment of this invention.

FIG. 20 is a schematic chart showing a process of analyzing image data used in the preferred embodiment of this invention.

FIG. 21 is a schematic chart showing a process of analyzing image data used in the preferred embodiment of this invention.

FIG. 22 is a schematic chart showing a process of analyzing image data used ing the preferred embodiment of this invention.

FIG. 23 is a schematic chart showing a process of analyzing image data used in the preferred embodiment of this invention.

FIG. 24 is a schematic chart showing a process of analyzing image data used in the preferred embodiment of this embodiment of this invention.

FIG. 25 is a manner in which a field detected in the preferred embodiment of this invention is displayed on a display screen with identification.

FIG. 26 is a chart for explaining a conventional ledger slip defining process.

DETAILED DESCRIPTION OF THE PREFERRED EMBODIMENTS OF THE INVENTION

The terminology used in the description is explained before this invention is described. In the preferred embodiment of this invention, the term "line segment" generally refers to a vertical line and a horizontal line detected from the image data. The term "cell" is a closed area circumscribed by a plurality of vertical lines and horizontal lines as shown in FIG. 2 and in which no other line is detected.

The term "cell string" refers to a single cell or a set of a plurality of consecutive cells in which a numeral, a character or a symbol, etc., which is treated as meaningful information by being concatenated is entered, such as a membership number input field.

The term "cell group" refers to a set of cell strings extracted for detecting a cell string which should be treated as a same kind of cell or cell string. The set is not changed by adding a cell string which is already included therein.

N(G): the number of cell strings included in a cell group.
R(C): X coordinate of the right end of a cell string C
L(C): X coordinate of the left end of a cell string C
T(C): Y coordinate of the upper end of a cell string C
B(C): Y coordinate of the lower end of a cell string C
GL(X): a cell group comprising a set of cell strings C in which R(C)=x
GR(x): a cell group comprising a set of cell strings C in which L(C)=x The term "X coordinate pool" is an ordered set which the values of X coordinates are ordered in an ascending order (from the left to the right). The set is not changed by adding and X coordinate already included in the set.

The term "field" is a set of repeating cell strings having a single meaning. It is obtained as a cell eventually belonging to "effective cell group chain". It includes "Name", "membership Number" and "Address", etc.

The system configuration of this invention is now described with reference to the block diagram of FIG. 3. In the preferred embodiment of this invention, the image processing system 100 is provided with an image input part 101, a user input part 102, a processing result displaying part 103, a display device 105, a control part 107, an image data holding part 109, a cell detecting part 111, a cell data/cell string data holding part 113, a cell string joining and expanding part 115, a cell end point detecting part 117, a left/right cell group detecting part 119, a field detecting part 121, an X coordinate pool 123, 125, a cell repetition determining part 129, and an effective cell group chain 131–135.

The image input part 101 obtains image information of a ledger slip inputted from the scanner and the like and transfers the image information to the control part 107 which, in receiving the image holding part 109.

The user input part 102 transfers to the control part 107 an operation such as an input of the start/end of processing, designation of a cell on the screen using a pointing device, and an input of attribute information.

The display part 103 displays on the display device 105 image information of a ledger slip held by the image data holding part 109, and information identifying a field detected from the image data. The control part 107 controls components.

The cell detecting part 111 analyzes image data saved in the image holding part 109 and detect vertical lines and horizontal lines included in the image data. The X coordinate of the detected vertical line is held in the X coordinate pool "A" 123. A cell is detected by information of the detected vertical and horizontal lines. The cell data detected by the cell detecting part is saved in the cell data/cell string data holding part 113.

FIG. 4 is a schematic chart of cell data in the preferred embodiment of this invention. As shown in the figure, the cell data 210 manages information of a cell ID 211, the upper left X coordinate 213, the upper left Y coordinate 215, the lower right X coordinate 217, and the lower right Y coordinate 219 of the circumscribing rectangle. The cell data 210 in the preferred embodiment of this invention is stored in the sequence of the X coordinate 213 and the Y coordinate 215 of the cell starting point.

The field detecting part 121 controls the cell string joining and expanding part 115, the cell end point detecting part 117, the left/right cell group detecting part 119 and, the cell repetition determining part 129 to detect a field included in the image data.

The cell string joining and expanding part 115 concatenates a plurality of sets of cells in which information is written which is treated as meaningful information when concatenated together, such as a member ship number input field into a single cell string.

FIG. 5 is a schematic chart of cell string data in the preferred embodiment of this invention. As shown in the figure, the cell string data 220 manages information of the cell string ID 221, the number of cells comprising the cell string 223, and the cell ID's 225–229.

The cell repetition determining part 129 determines the mode of the repetition of cells and eliminates those cell strings which are determined not to be included in the field.

The cell end point detecting part 117 accesses to cell data stored in the cell data/cell string data holding part to detect the upper end and the lower end, etc., of predetermined cell data. The left/right cell group detecting part 119 detects whether a cell string exists to the left or right of a predetermined X coordinate.

FIG. 6 is a schematic chart of cell group data in the preferred embodiment of this invention. As shown in the figure, the cell group data 240 manages information of the cell group data 240 manages information of the cell group ID 241, the number of cell strings comprising the cell group 243, and the cell string ID's 245–249.

FIG. 7 is a schematic chart of a cell group chain in the preferred embodiment of this invention. As shown in the figure, the cell group chain 250 manages information of the number of cell groups comprising the cell group chain 251 and the cell group ID's 253–257.

The X coordinate pool 123 stores an X coordinate value of a vertical line detected from image data. The X coordinate pool 125 temporarily holds the X coordinate value stored in the X coordinate pool 123 for analyzing the image data.

FIG. 8 is schematic chart of the X coordinate pool in the preferred embodiment of this invention. As shown in the figure, the X coordinate pool 260 manages information of the number of vertical lines, and values of X coordinates 263–267.

While the components of this invention shown in FIG. 3 have been described, they are logical functional blocks and it is not meant that each of them is implemented in the form of a discrete hardware or software. They may be implemented in the form of a composite or common hardware or software. For example, when concatenation of cell strings of the preferred embodiment of this invention is not involved, the cell joining part is not necessary. In such case, a dotted line or a thin line may be excluded from the subject of recognition upon detection of a cell so that an amount column and the like may be recognized as a single cell.

The operation procedure in the preferred embodiment of this invention is now described hereunder.

FIG. 9 is a flow chart showing a general processing procedure in the preferred embodiment of this invention. Process is started in the block 301 first of all. The image input part 101 obtains an image inputted from the scanner and the image is held in the image data holding part 109 (step 303). The image data is inputted in a design stage to determine the position, the size, and the attribute of a character or symbol and the method of recognition employed when a ledger slip is actually inputted with each field filled with characters or symbols. In the preferred embodiment of this invention, the image data held in the image data holding part 109 is sent to the display part 103 via the control part 107. The display part 103 displays the image data in the display device 105. FIG. 11 is image data of a ledger slip inputted from the scanner.

The image data stored in the image holding part 109 is analyzed by the cell detecting part 111 (step 305). In the preferred embodiment of this invention, the image data inputted from the scanner and held in this invention, the image input part 111 is in a binary bit map format indicating black when a pel value is 1 while it indicates white when the value is 0. However, this invention is not a technology which is limited to processing only binary image data and is applicable to a bit map image of color data in which each pel values assume a value within a given range, the pels may be recognized as pels comprising a frame or a cell while they may be recognized as pels comprising a backgrounds portion rather than a frame and the like when pel values do not assume a value within a given range.

In the preferred embodiment of this invention, the cell detecting part 111 counts the number of black pels in the horizontal and the vertical direction to detect Y and X coordinates which assume a peak, respectively. A portion where more than predetermined number of black pels continue along either coordinate is deemed to be a line segment. This is for the purpose of eliminating a noise due to dust, a skew of a ledger slip, the quality of the scanner, erroneous setting of the density, and influence of characters written on the slip. The X coordinate data of all vertical lines recognized is saved in the X coordinate pool "A" 123.

A mesh of matrix shape is then formed by X coordinates of all vertical lines and Y coordinates of all horizontal lines and it is determined whether each individual rectangle makes an area which is circumscribed by line segments or a part thereof inside the area. In the preferred embodiment of this invention, by examining the connectivity of a line segment comprising the cell, a cell is prevented from being detected partly by being split by a character and the like written inside the cell. When more than a predetermined number of black pels are detected inside the detected cell, the cell is determined to be a title portion and may be excluded from the subject of field detection of this invention. If an area satisfying the condition is found, it is determined to be a cell and the coordinate values of the starting point (upper left coordinate) 213, 215 and the coordinate values of the end point (lower right coordinate) 217, 219 of the circumscribing rectangle of the cell are stored in the cell data/cell string data holding part 113 as cell data. Cell ID's are assigned sequentially to each cell data. At this point, each cell string data 220 is defined so that a condition of 1 cell=1 cell string is met and held in the cell data/cell string data holding part 113. Specifically, the value of the cell ID 211 is set in the cell string ID 221 and the ID of cell 0 (225) and the number N 223 are set to "1".

When the cell has been detected, a process of detecting a field and preparation of an effective cell group chain is then performed (step 307). FIG. 10 is a flow chart showing the processing procedure of the field detection and the process of preparing the effective cell group chain in the preferred embodiment of this invention.

As shown in the figure, the procedure starts at the step 351. An initial value of the X coordinate pool "P" 125 is set first of all (step 353). Specifically, an X coordinate which has a target cell immediately to the left thereof is searched for all X coordinates of the X coordinate pool "A" 123 and registered as an initial value of "P". That is, an X coordinate which satisfies the following expression is extracted from the X coordinate pool "A" 123.

$$p=\{\forall x \in A | N(GR(x)) \neq O \wedge N(GL(x))=0\}$$

In the example of FIG. 12, $X_0$ and $X_1$ enter the X coordinate pool "P" 125.

Thereafter, an X coordinate which must be processed is consistently added to the X coordinate pool "P" 125 is empty (step 355). When the X coordinate pool "P" 125 is not empty, a leftmost (minimum) X coordinate value is extracted from the X coordinate pool "P" 125 (step 361).

Figure 14:
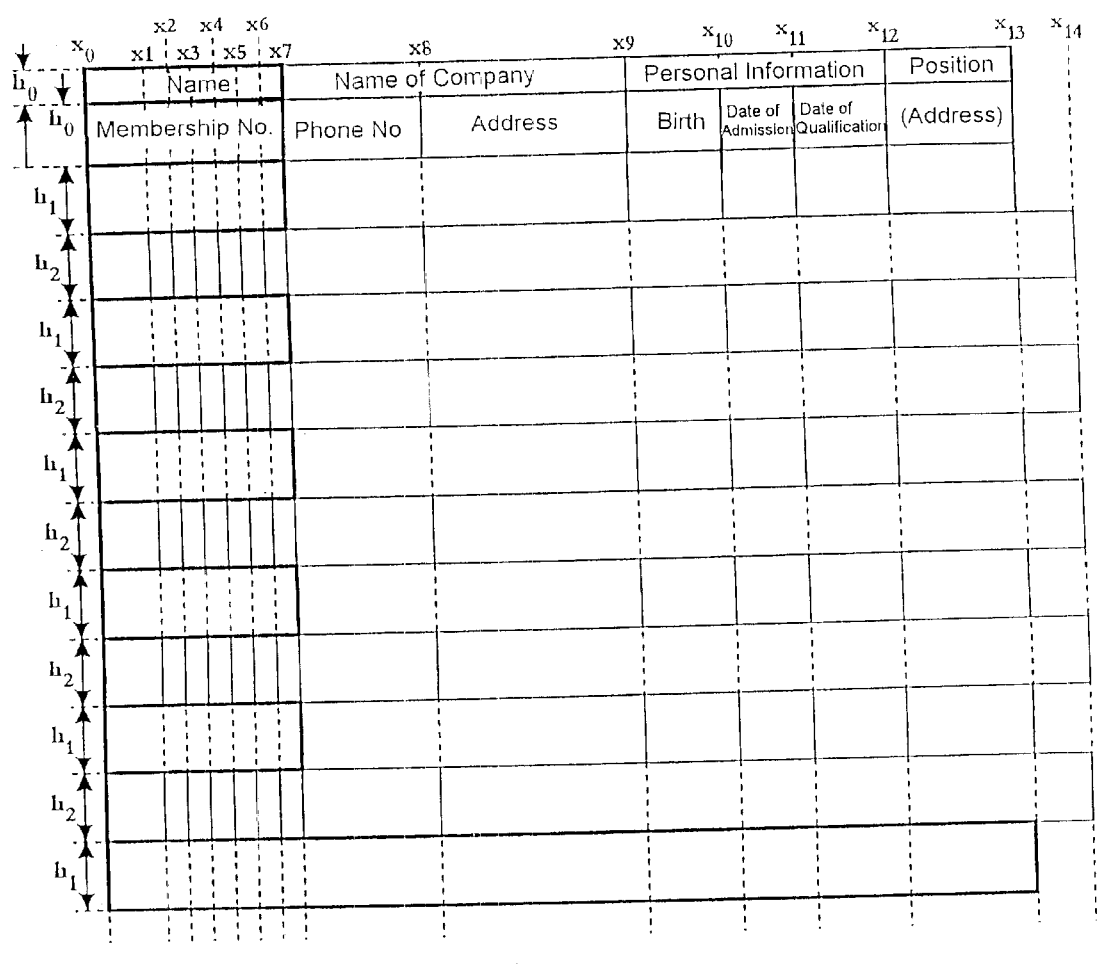
Figure 15:
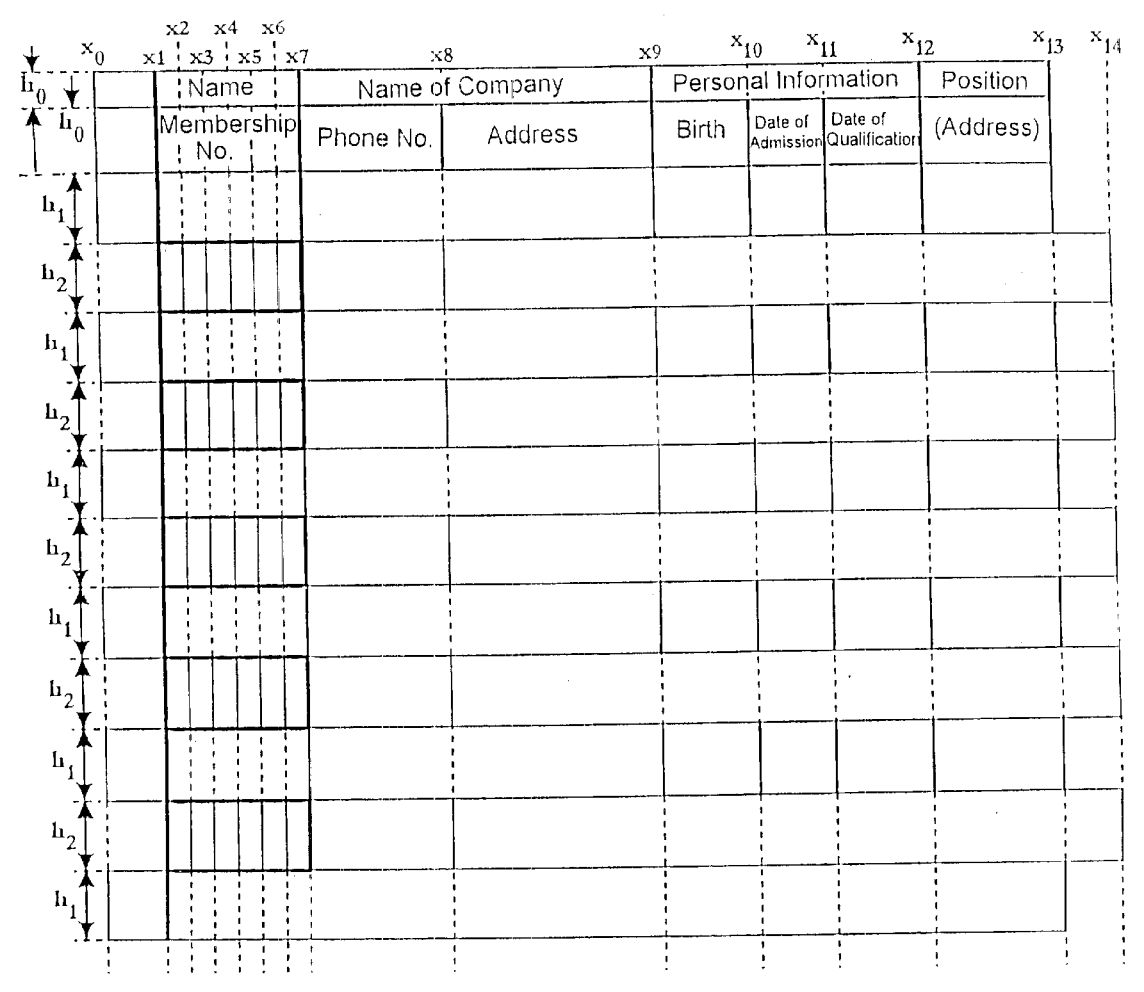
Figure 16:
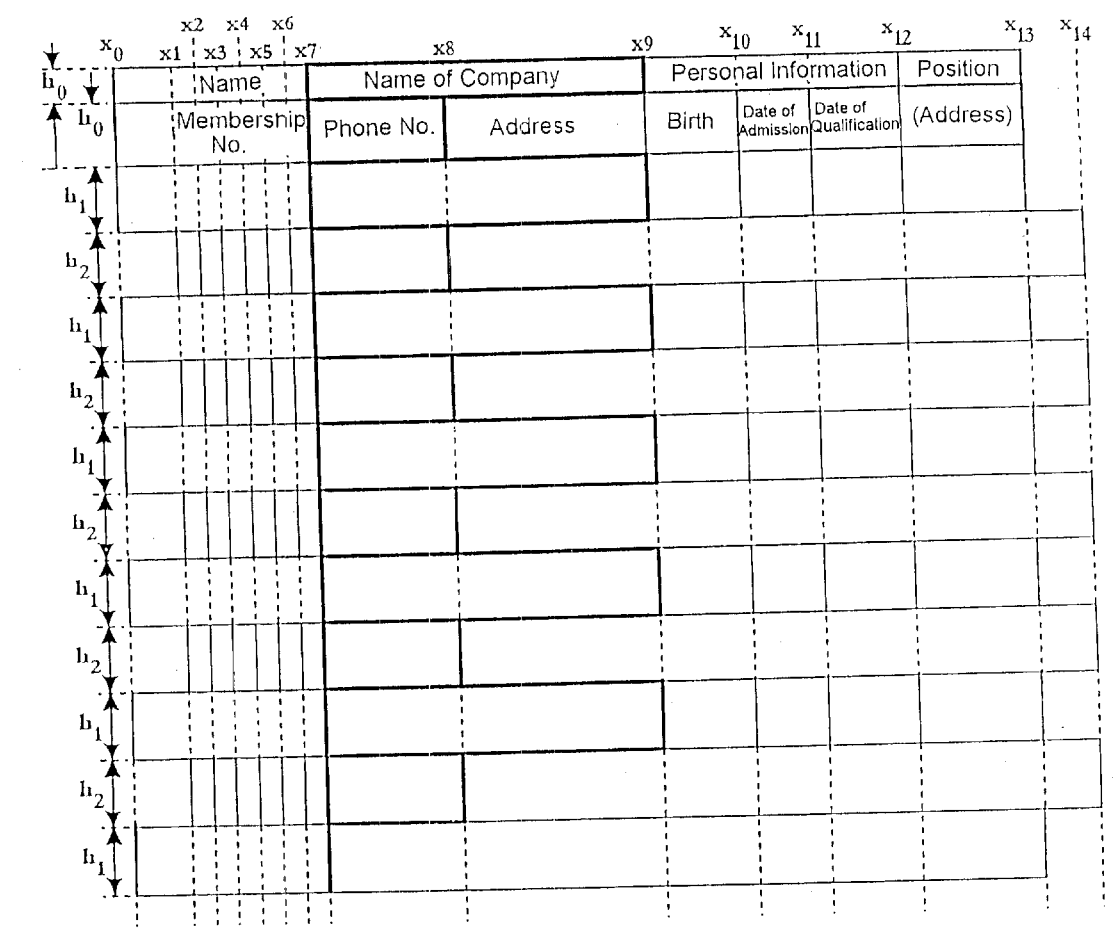
Figure 17:
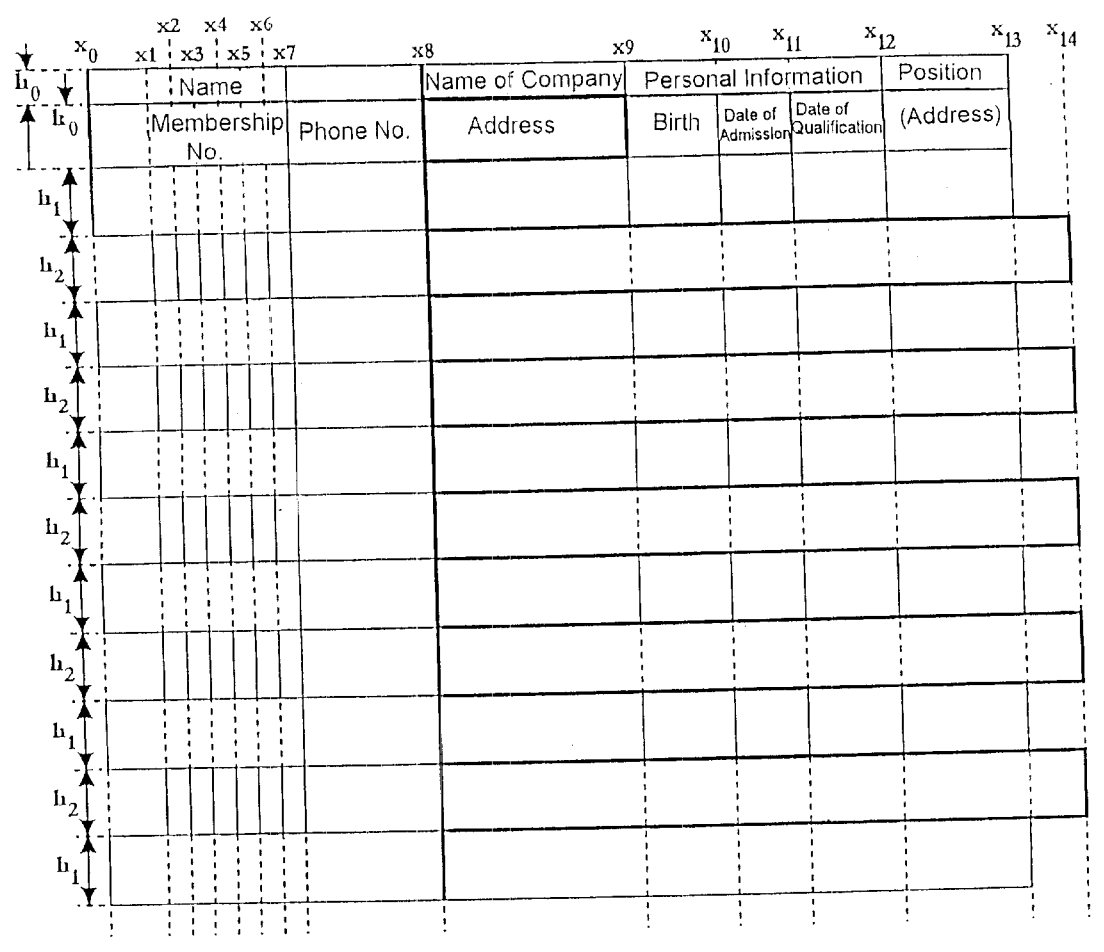
Figure 19:
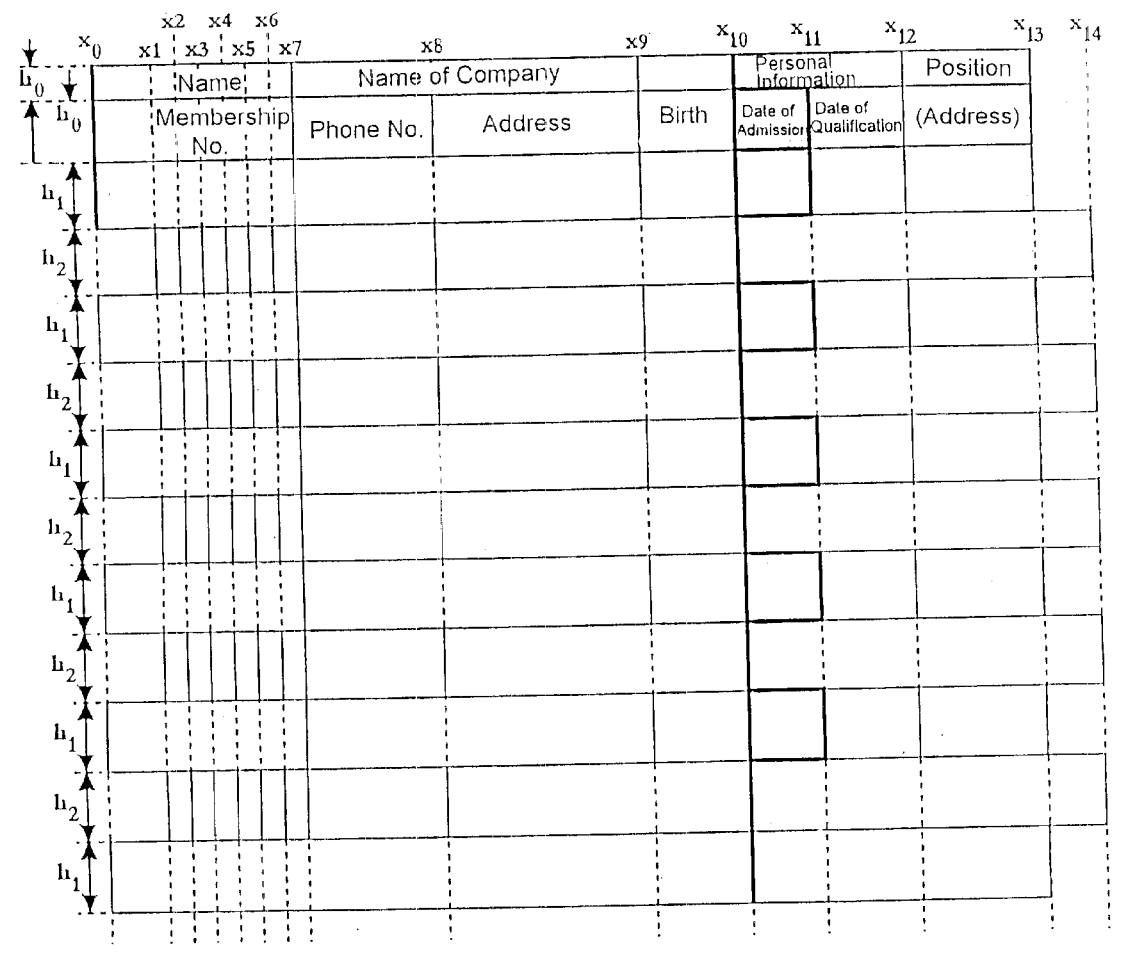
Figure 20:
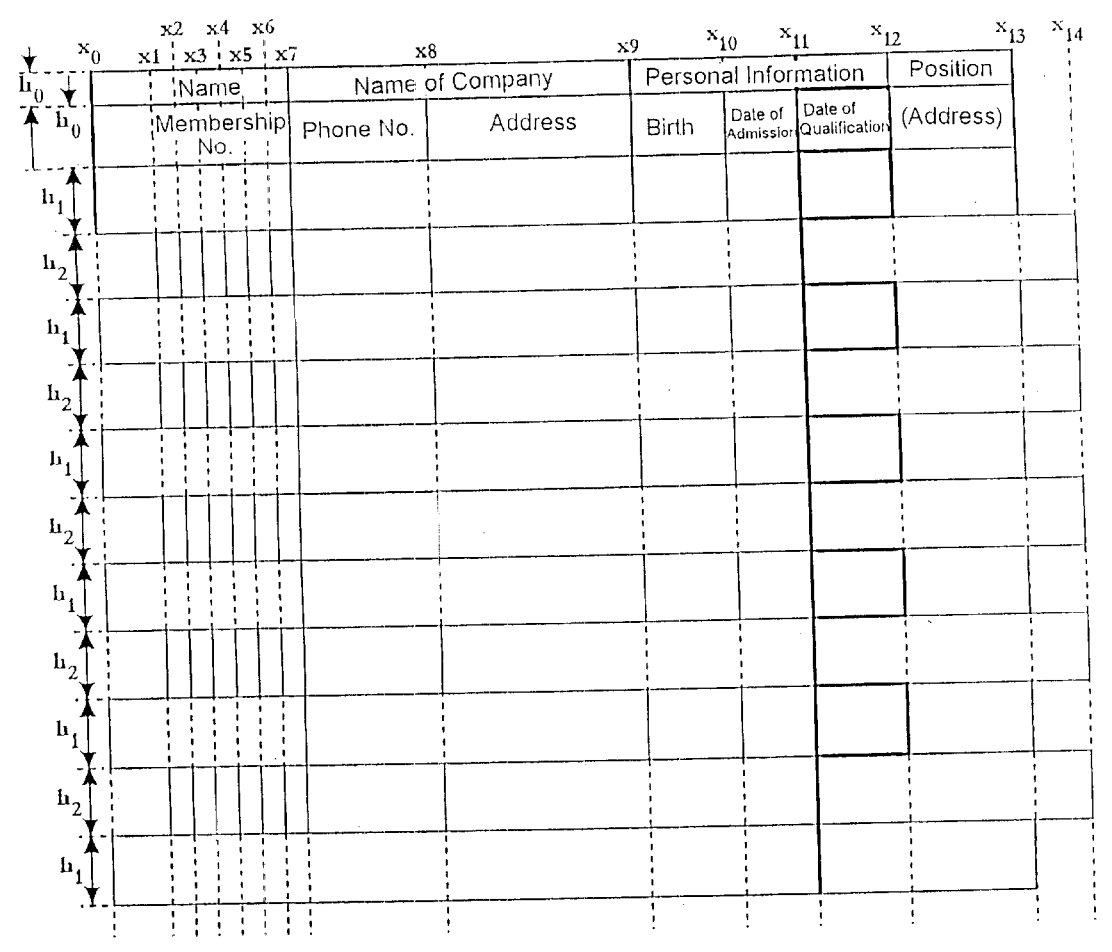
Figure 21:
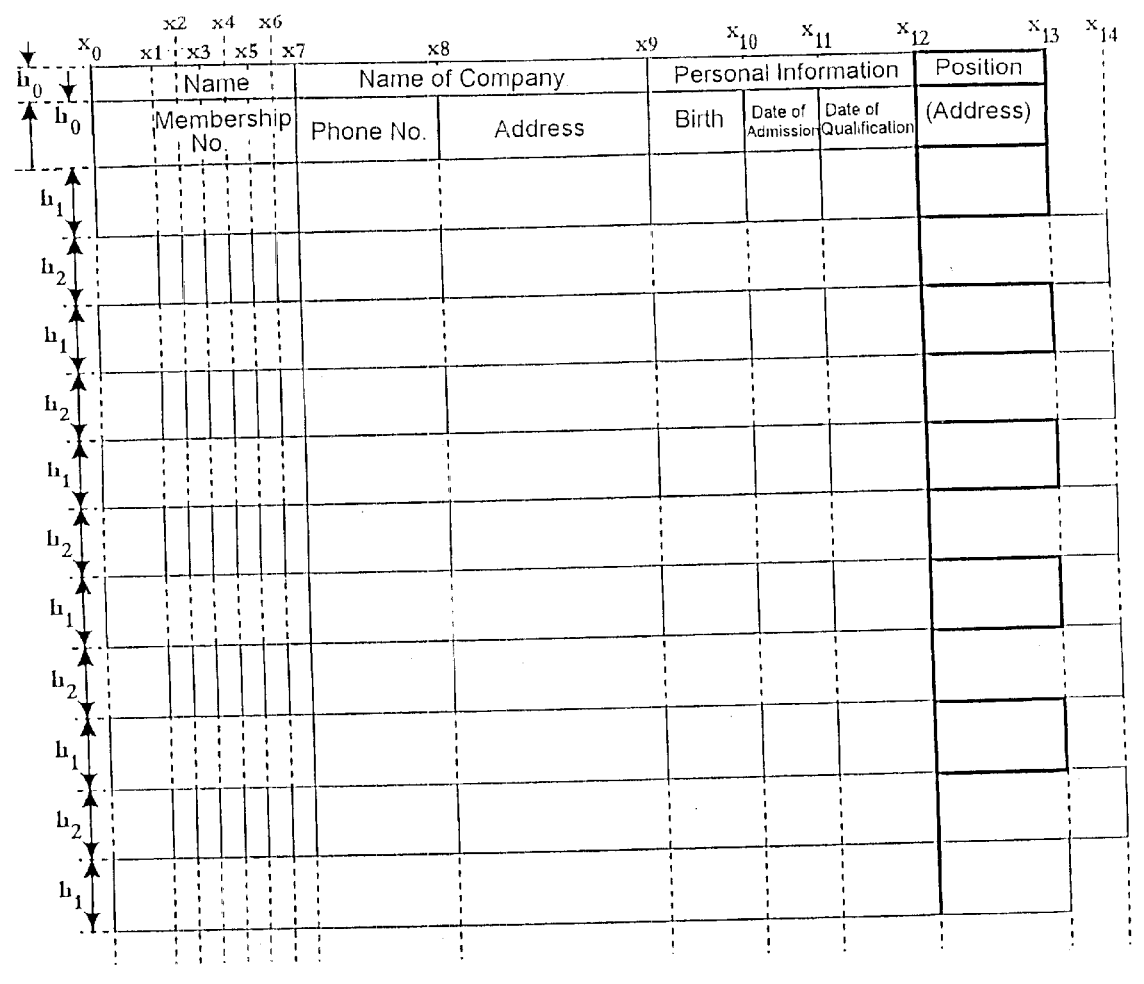
Figure 22:
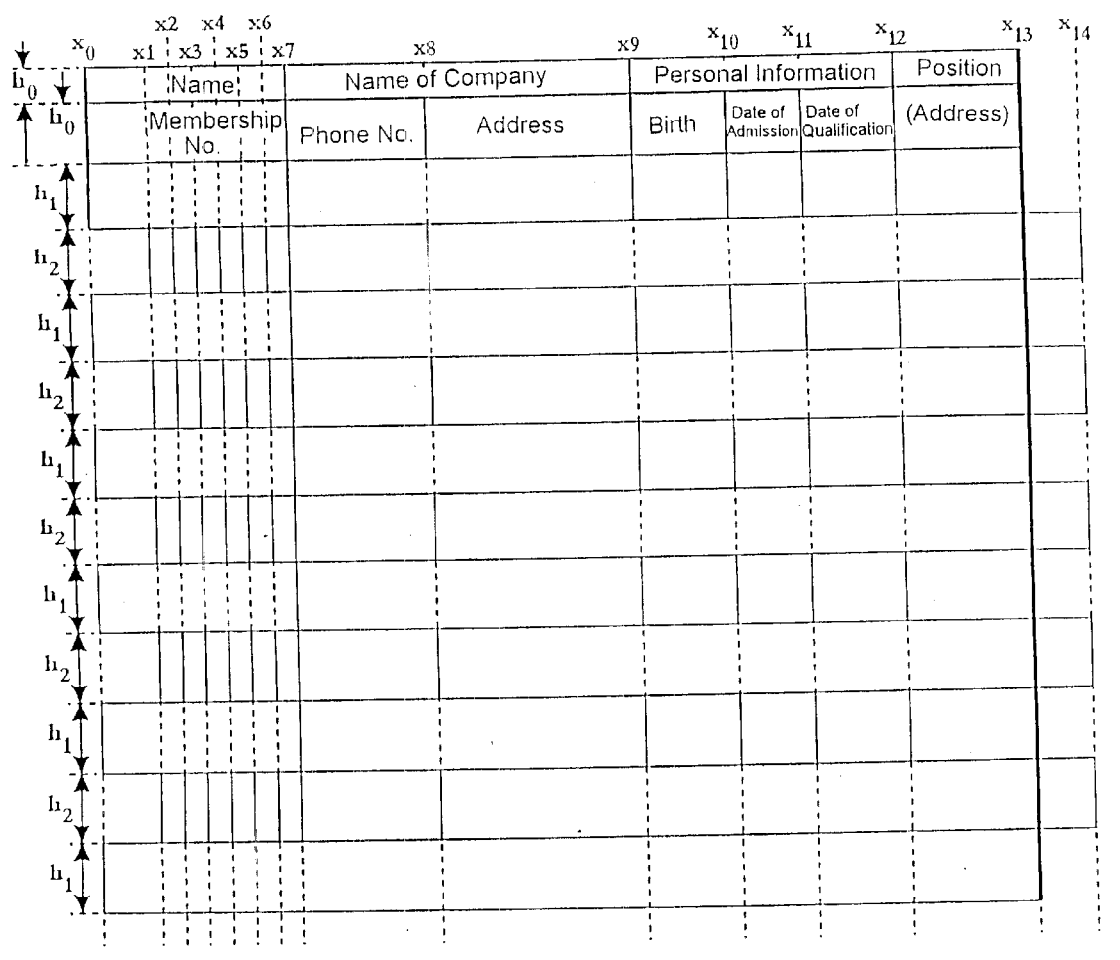
Figure 23:
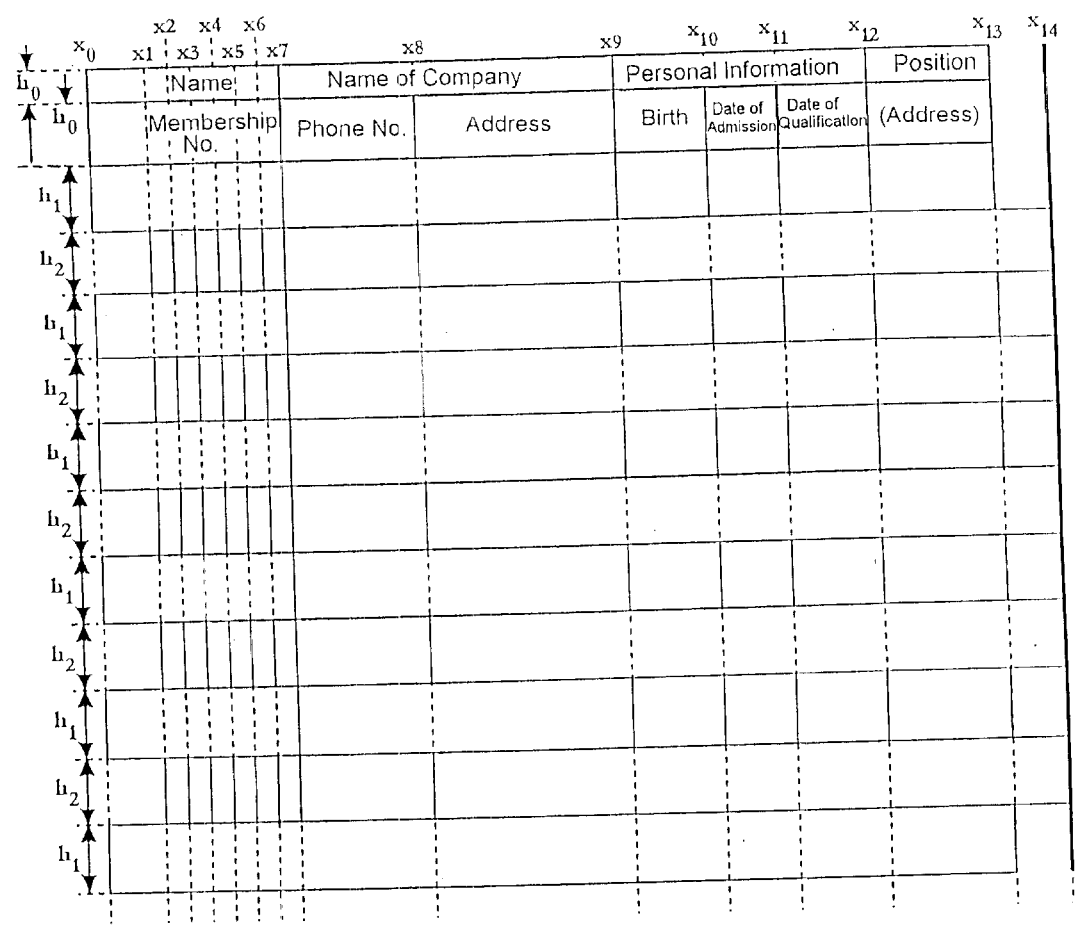

The cell data/cell string data holding part 113 is then searched for cell data of which the current X value coincides the X coordinate value 213 of the starting point of the circumscribing rectangle. Then, cell string data 220 holding the cell ID 211 in the ID 225 of the cell 0 is extracted (step 362), FIGS. 14–23 are cell strings extracted (eventually) at $X_0, X_1, X_7$–$X_{14}$, respectively.

The process of joining and expanding cell strings is performed for the cell strings extracted in the step 362 (step 363). In the cell string joining and expanding process, the field detecting part 121 calls a "cell string joining and expanding part" 115 to determine whether cell data items in the cell string data (the cell data matched the cell string at an initial point of time) are continuous in the horizontal direction when the shape of the cell string is longer in the vertical direction. If the cell data items are continuous, they are deemed to be single cell string in a bundle.

Specifically, the cell string joining and expanding part 115 processes the current cell string when the following conditions are met for the current cell string.

(1) 1 cell string=1 cell. In other words, the number of cells 223 of the cell string data is "1".

(2) The current cell is longer vertically. In other words, when the cell data of the cell 0 (225) of the cell string data 220 is accessed, the value of (Y coordinate of the end point—Y coordinate of the starting point (/X coordinate of the end point—X coordinate of the starting point) is examined. Also, the cell string data 220 having the cell ID in the cell 0 (225) is retrieved to examine whether the number of cells 223 thereof is 1.

Incidentally, when it is said that the width or the height is "equal", of the X coordinate "coincides" in the process of the "cell string joining and expanding part", it is meant that they coincide within a tolerance.

When such cell string is found, the following process is performed as shown in FIG. 12.

(1) A cell above the current cell is searched for. If the left end and the right end of the cell are in the same X coordinates as the current cell, a cell further above that cell is checked. This is done for dividing a cell string based on the title column when an amount column extends in the horizontal direction.

(2) If a cell is not found in the above, the process goes to the step (5) to continue to process.

(3) If the X coordinate of the right end of the upper cell coincides that of the current cell with the above (1) and (2) not being met, the process is ended.

(4) If the upper cell does not meet the above, the process goes to the step (5) and continue.

(5) The cell to the right of the current cell is added to the current cell string and the cell string to which that cell belonged is discarded (removed from the cell string data holding part). The number of cells 23 is incremented by 1.

(6) The next right cell becomes the current cell.

(7) The cell to the right of the current cell is checked. If it exists and satisfies the condition of 1 cell string =1 cell and is a cell which has equal height and width to the current cell, the process returns to the step (1) and continues.

(8) If there is no cell to the right or the cell does not meet the condition, the process is ended.

In this manner, a plurality of cells which are separated into respective digits, such as an amount column is grouped into a single cell string. By this, the cell string becomes the state shown in FIG. 13. If the amount column and the like is sectioned by dotted lines or thin lines, they are excluded form the subject of detection in the cell part 111 and the joining process of the cell string described in the preferred embodiment of this invention will not be required.

After completion of the cell string joining processing, each extracted cell string data is examined and classified to a cell group in which the right end of cell strings have a same value (step 365). Specifically, the number of cells 223 of the extracted cell string is examined and the ID of the rightmost cell data is searched to obtain the X coordinate 217 of the end point of the cell data 210 of that cell ID for classification. The cell group is put in the form;

GR(x)={C0, C1 . . . , Cc} where C0, C1 . . . , Cc} are cell strings.

Putting the right end X coordinate for cell strings as Ri for each Ci (i=0, 1, . . . ,c), Ri=R(Ci)

Cell strings of which Ri coincides within a certain tolerance are grouped.

The classified cell strings are then saved as cell group data as shown in FIG. 6. The cell groups are assigned sequential cell group ID's such as $N(NG_0) \leq N(G_1) \leq \ldots \leq N(G_g)$ where $G_0, G_1, \ldots, G_g$ are extracted cell groups. The number of cell strings included in each cell group is stored in the number of cell strings 243.

It is then determined whether the number of the cell group data items extracted in the step 365 exceeds 2 (step 367). This is because a multi-entry ledger slip in which each record (stage) exceeds 2 lines is not processed in the preferred embodiment of this invention.

When the number of the cell group cell data items extracted in the step 365 exceeds 2, a cell string of the upper end or the lower end is cut out so that the number of the cell groups is 2 or less (step 369).

FIG. 24 is a chart for explaining this algorithm. In the figure, all cell strings to the right of the current X have been extracted. The cell strings are sorted into types only by the width of a cell string and classified into Type 1 to Type 4.

The descending order from the top and the ascending order from the bottom of each cell string is examined first of all (1 is the base number) in the preferred embodiment of this invention. For all cell strings of the same length, the descending order from the top of a cell string is added to the ascending order from the bottom of the next cell string of the same length. The resulting number is the number of the cell strings which are cut out when the cell string of that length is to be cut out. Accordingly, for the cell strings for which the number of cell strings to be cut out is the least among all the cell strings of a same length, all cell strings of a same width are cut out. At this time, the cell string in lowest position among the cell strings which are cut out as cell strings of the upper end is registered in a cell group $G_{xcut1}$ for managing a cut cell string while the cell string in the highest position among the cell strings which are cut out as the lower end cell strings is registered in a cell group $G_{cut2}$ for managing a cut cell string.

On the other hand, when it is determined that g=0 in the step 367, it is determined that this X coordinate need to be processed (this corresponds to the rightmost vertical line) and the processed X coordinate is deleted from the X coordinate pool "P" 215 (step 397).

On the other hand, when it is determined that g=2 in the step 371, it is examined whether a condition $0.4 \leq N(G_0)/(N(G_0)+N(G_1)) \leq 0.6$ us satisfied (step 373). This is for excluding a title, a footnote or a note inserted.

When the conditions $0.4 \leq N(G_0)/(N(G_0)+N(G_1)) \leq 0.6$ is not met, $G_1$ is cut out (step 375). In a ledger slip in which a title and the like which is irrelevant to recognition does not appear in the middle of the ledger slip, all cell strings included in $G_1$ are registered in a cell group $G_{cut}$ (when cut out as cell strings of the upper end) and the title which is not necessary for recognition is removed from the field.

When the condition $0.4 \leq N(G_0)/(N(G_0)+N(G_1)) \leq 0.6$ is met, the cell groups $G_0$ and $G_1$ are added to the effective cell group chain (step 391). Specifically, the chain number of the cell group chain 250 of FIG. 7 is incremented by 1 and the ID of the cell group is added.

Further, for all $C_i \epsilon G_0$ X coordinate R(Ci) is added to the X coordinate pool "p" 125 for processing and, similarly, for all $C_j \epsilon G_1$ X coordinate R(Cj) is added to the X coordinate pool "P" 125 for processing (step 393). for the cell group $G_0$ and $G_1$, the cell repetition determining part 129 is called up to remove cell strings which do not repeat the height (step 395). Specifically;

(1) the heights of cell strings included in the cell group are put as h0, h1, h2, . . . , h15 in sequence from the top.

(2) The ratios of h0:h1h1:h2, . . . , h14:h15 are calculated and put as r0, r1, . . . , r14.

(3) It is examined how many ratios which are in the range of 1.00±0.1 are consecutive from r2 to r13, 12 ratios are consecutive.

(4) The ratios of h0:h2, h1:h3, . . . , h13:h15 are calculated and put as q0, q1, . . . , q13.

(5) It is examined how many ratios which are in the range of 1.00±0.1 are consecutive among the ratios. For example if the ratios are consecutive from q5 to q12, 8 ratios are consecutive.

(6) The larger one of the numbers of (3) and (5) is chosen, If the numbers are equal, the number of (3) is chosen.

(7) When (3) is chosen, it is determined that hi to h14 repeat in an equal interval in the above example.

(8) When (5) is chosen, it is determined that h5 to h14 repeat in an equal interval in the above example.

And, cell strings which do not repeat are eliminated. When the step 395 is finished, the processed X coordinate is deleted from the X coordinate pool "P" 215 (step 397) and processing of the next X begins.

When it is determined that g=1 in the step 371 or when the condition $0.4 \leq N(G_0)/(N(G_0)+N(G_1)) \leq 0.6$ is not met and $G_1$ is cut out, the cell group $G_0$ is added to the effective cell group chain (step 377).

Further, for all $C_i \epsilon G_0$, X coordinate R (Ci) is added to the X coordinate pool "P" 125 for processing (step 379). For all the cell group $G_0$, the cell repetition determining part 129 is called up to eliminate cell strings which do not repeat (step 381).

Cell strings which do not repeat are then eliminated. When the step 395 is finished, the processed X coordinate is deleted from the X coordinate pool "P" 215 (step 397) and processing of the next X begins.

When all X coordinate values put in the X coordinate pool "P" 215 have been processed, a process of flushing the height is performed by cut information of other cell groups (step 357). Specifically, for a cell string Ci of $G_{cut1}$, the maximum value (the lowest) of B (Ci) is put as Y1 and, for a cell string Dj of $G_{cut2}$, the minimum value (the highest) of T(Dj) is put as Y2. Cell strings included in the range no greater than Y1 and no less than y2 are then eliminated for each cell group belonging to the effective cell group chain.

When such process of detecting a field/preparing the effective cell group chain (step 307, FIG. 9) has been finished, a plurality of fields as shown in FIG. 9) has been finished, a plurality of fields as shown in FIG. 25 are identified and displayed (step 309.) Specifically, each of a plurality of cell groups included in the cell group chain 250 is assigned a pattern or a color and cell data belonging to each cell group is searched using the ID 241 of the cell group data and the ID 221 of the cell string. Cell strings included in each cell group are overlaid with a rectangle of a pattern or a color according to information of the starting point and the end point of the cell data, and information of the cell string data for display.

The operator can manually modify the recognized field. Methods of modifying the recognized field include; a technique of clicking and dragging the upper left and lower right, a technique of selecting a field to be modified by a mouse clicking and the like and executing a command such as "expand area downward", "compress area from the bottom", "expand area downward", "compress area from the bottom", "expand area upward", "compress area from the top" from a keyboard or a menu to enlarge the area to a range including the next lower cell, a technique of selecting a field by a mouse while depressing the Ctrl key, and a combination of such techniques.

In one mode of the preferred embodiment of this invention, when an arbitrary point of the cell group which is recognized as a field and displayed is clicked by the right button of a mouse, the entire cell group selected is displayed with highlight and a pull down menu is displayed (not shown). This can be done by detecting data including the position where the right button of the mouse is depressed, searching the cell string and the cell group including that cell and displayed the cell data included in that cell group with identification.

When the operator selects division of the cell group from the pull down menu, that cell group is abolished and cell strings included in that cell group become an independent cell string.

When the position where the right button is clicked is a part of a cell string including a plurality of cells in this mode, a display to cause the operator to choose an operation on the cell string or an operation on the cell group is outputted to the display screen. If the operator chooses an operation on the cell string and specifies division of the cell string, that cell is abolished, the cells included in that cell string are registered as an independent cell string and registered in a cell group including that cell string, it becomes an independent cell string).

In the preferred embodiment of this invention, an attribute can be then entered using an attribute input window 930 related to the specified field as shown in FIG. 26. By this operation, attribute information can be associated to a plurality of cell stings in a bundle. Each input window 930 shown in FIG. 26 is set to a default value.

The attributes shown in the window 930 include a font attribute 951 to 955 which allow 3 kinds of fonts including handwriting, stamp and print to be specified. Using this attribute, the method of character recognition may be changed to improve the recognition rate.

The kinds of characters 961 to 973 indicate characters possibly inputted in the field. The recognition level 981 to 985 can select to treat a character which is likely to be erroneously recognized as a result for a moment or to eliminate it as an error. The output code is an entry for selecting DBCS or SBCS to output the recognition result.

The attributes displayed here are simply for exemplary purpose. It is also possible to include a presence or the absence of a need of a knowledge processing where sandwiched between numerals can be recognized as a hyphen rather than a prolonged sound "-" or 1 of Kanji (-) such various information associated to a field is included in the category of "attribute information" written in the claims of this specification. When such attribute information is inputted or modified and OK button is clicked, an attribute information record is prepared and saved in the system.

As described in the above, this invention can provide a system which reduces a ledger slip defining work done by an operator as much as possible while preventing an error of ledger slip definition.

While the invention has been particularly shown and described with respect to preferred embodiments thereof, it will be understood by those skilled in the art that the foregoing and other changes in form and details may be made therein without departing form the spirit and scope of the invention.

Having thus described as invention, what we claim as new, and desire to secure by letters patent is:

1. A method of analyzing image data inputted in an image data analyzing apparatus, said method comprising the steps of:
   (a) scanning said image data to extract a plurality of cell data items including a starting coordinate value (x,y) and height information,
   (b) extracting a cell group from said plurality of cell data items, such that each cell data item in the cell group has the same starting x coordinate value,
   (c) examining the height information of cells included in said extracted cell group to determine if any cells have a height information different from other cells in said extracted cell group, and
   (d) eliminating a cell having a different height information from said extracted cell group based on the result of step c).

2. A method of analyzing image data inputted in an image data analyzing apparatus, said method comprising the steps of:
   (a) scanning said image data to extract a plurality of cell data items including a starting coordinate value (x,y) and height and width information,
   (b) extracting a cell group from said plurality of cell data items, such that each cell data item in the cell group has the same starting x coordinate value,
   (c) analyzing width information of cells included in said extracted cell group to extract a first cell group and a second cell group from said extracted cell group,
   (d) examining the height information of cells included in said first cell group to determine if any cells have a height information different from other cells in said first cell group, and
   (e) eliminating a cell having a different height information from said first cell group based on the result of step d).

3. A method of analyzing image data inputted in an image data analyzing apparatus, said method comprising the steps of:
   (a) scanning said image data to extract a plurality of cell data items including a starting coordinate value (x,y) and width information,
   (b) extracting a cell group from said plurality of cell data items, such that each cell data item in the cell group has the same starting x coordinate value,
   (c) examining the width information of cells included in said extracted cell group, and
   (d) extracting cells having substantially same width information among cells included in said extracted cell group as a new cell group.

4. A method of analyzing image data inputted in an image data analyzing apparatus which is provided with an input device and a display device, said method comprising the steps of:

(a) scanning said image data to extract a plurality of cell data items including a starting coordinate value (x,y) and height information, (b) extracting a cell group from said plurality of cell data items, such that each cell data item in the cell group has the same starting x coordinate value, (c) examining the height information of cells included in said extracted cell group to determine if any cells have a height information different from other cells in said extracted cell group, and (d) eliminating a cell having a different height information from said extracted cell group based on the result of step c) to generate a new cell group, (e) displaying said new cell group in said display device, (f) detecting that cells included in said new cell group are selected by an operator using said input device, and (g) saving attribute information inputted by said operator in correlation to at least a partial set of cells included in said new cell group.

5. An image analyzing apparatus for analyzing image data held in an image data holding part, said apparatus comprising:

(a) a cell detecting part for extracting a plurality of cell data items including a starting coordinate value (x,y) and height information from scanned image data, (b) a field detecting part for extracting a cell group from said plurality of cell data items, such that each cell data item in the cell group has the same starting x coordinate value, (c) a cell repetition determining part for examining the height information of cells included in said extracted cell group to determine if any cells have a height information different from other cells in said extracted cell group, and eliminating a cell having a different height information from said extracted cell group.

6. A computer program product for analyzing image data inputted in an image data analyzing apparatus, said computer program product comprising:

(a) computer readable code for instructing said image data analyzing apparatus to extract a plurality of cell data items including a starting coordinate value (x,y) and height information from scanned image data, (b) computer readable code for instructing said image data analyzing apparatus to extract a cell group from said plurality of cell data items, such that each cell data item in the cell group has the same starting x coordinate value, (c) computer readable code for instructing said image data analyzing apparatus to examine the height information of cells included in said extracted cell group to determine if any cells have a height information different from other cells in said extracted cell group, and (d) computer readable code for instructing said image data analyzing apparatus to eliminate a cell having a different height information from said extracted cell group based on the result of step c).

7. A computer program product for analyzing image data inputted in an image data analyzing apparatus, said computer program product comprising:

(a) computer readable code for instructing said image data analyzing apparatus to extract a plurality of cell data items including a starting coordinate value (x,y) and, height and width information from scanned image data, (b) computer readable code for instructing said image data analyzing apparatus to extract a cell group from said plurality of cell data items, such that each cell data item in the cell group has the same starting x coordinate value, (c) computer readable code for instructing said image data analyzing apparatus to analyze the width information of cells included in said extracted cell group, and to extract a first and a second groups of cells from said extracted cell group, (d) computer readable code for instructing said image data analyzing apparatus to examine the height information of cells included in said first cell group to determine if any cells have a height information different from other cells in said extracted cell group, and (e) computer readable code for instructing said image data analyzing apparatus to eliminate a cell having a different height information from said first cell group based on the result of step d).

8. A computer program product for analyzing image data inputted in an image data analyzing apparatus, said computer program product comprising:

(a) computer readable code for instructing said image data analyzing apparatus to extract a plurality of cell data items including a starting coordinate value (x,y) and width information from scanned image data, (b) computer readable code for instructing said image data analyzing apparatus to extract a cell group from said plurality of cell data items, such that each cell data item in the cell group has the same starting x coordinate value, (c) computer readable code for instructing said image data analyzing apparatus to examine the width information of cells included in said extracted cell group, and (d) computer readable code for instructing said image data analyzing apparatus to extract cells having a same width information among the cells included in said extracted cell group as a new cell group.

9. A computer program product for analyzing image data inputted in an image data analyzing apparatus which is provided with an input device and a display device, said software product comprising:

(a) computer readable code for instructing said image data analyzing apparatus to extract a plurality of cell data items including a starting coordinate value (x,y) and height information from scanned image data, (b) computer readable code for instructing said image data analyzing apparatus to extract a cell group from said plurality of cell data items, such that each cell data item in the cell group has the same starting x coordinate value, (c) computer readable for code for instructing said image data analyzing apparatus to examine the height information of cells included in said extracted cell group to determine if any cells have a height information different from other cells in said extracted cell group, (d) computer readable code for instructing said image data analyzing apparatus to exclude cells having a different height information from said extracted cell group based on the result of step c) to generate a new cell group, (e) computer readable code for instructing said image data analyzing apparatus to display said new cell group in said display device, (f) computer readable code for instructing said image data analyzing apparatus to detect that cells included in said new cell group are selected by an operator using said input device, and (g) computer readable code for instructing said image data analyzing apparatus to save attribute information inputted by said operator in correlation to at least a partial set of cells included in said new cell group.

* * * * *